(12) United States Patent
Van De Sluis et al.

(10) Patent No.: US 12,008,891 B2
(45) Date of Patent: Jun. 11, 2024

(54) SELECTING A LIGHT SOURCE FOR ACTIVATION BASED ON A TYPE AND/OR PROBABILITY OF HUMAN PRESENCE

(71) Applicant: SIGNIFY HOLDING B.V., Eindhoven (NL)

(72) Inventors: Bartel Marinus Van De Sluis, Eindhoven (NL); Dzmitry Viktorovich Aliakseyeu, Eindhoven (NL); Tobias Borra, Rijswijk (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 93 days.

(21) Appl. No.: 17/908,674

(22) PCT Filed: Mar. 5, 2021

(86) PCT No.: PCT/EP2021/055536
§ 371 (c)(1),
(2) Date: Sep. 1, 2022

(87) PCT Pub. No.: WO2021/176029
PCT Pub. Date: Sep. 10, 2021

(65) Prior Publication Data
US 2023/0162577 A1 May 25, 2023

(30) Foreign Application Priority Data
Mar. 6, 2020 (EP) .................................. 20161412

(51) Int. Cl.
*G08B 5/28* (2006.01)
*G08B 5/38* (2006.01)
(Continued)

(52) U.S. Cl.
CPC ............... *G08B 5/38* (2013.01); *G08B 13/19* (2013.01); *G08B 13/19663* (2013.01); *G08B 15/00* (2013.01); *H04N 7/188* (2013.01)

(58) Field of Classification Search
CPC ...................................................... G08B 5/38
See application file for complete search history.

(56) References Cited

U.S. PATENT DOCUMENTS

| 6,609,812 B2 | 8/2003 | Machi et al. |
| 7,411,497 B2 | 8/2008 | Kates |

(Continued)

FOREIGN PATENT DOCUMENTS

| EP | 2605505 A1 | 6/2013 |
| WO | 2010079388 A1 | 7/2010 |

(Continued)

OTHER PUBLICATIONS

"Lighting for Perimeter Security Applications," Application Note, Fiber Sensys Perimeter Security, AN-SM-080 Rev. A 7-13, Copyright 2013, Fiber Sensys (21 Pages).

(Continued)

*Primary Examiner* — Travis R Hunnings

(57) ABSTRACT

A system (41) for activating an infrared light source is configured to receive input indicating human presence in a space, determine a type and/or probability of the human presence based on the input, decide whether to activate an infrared light source (12) or a visible-light light source (11) in the space based on the type and/or probability of the human presence, and activate the infrared light source or the visible-light light source in dependence on the decision.

11 Claims, 7 Drawing Sheets

(51) Int. Cl.
  *G08B 13/19* (2006.01)
  *G08B 13/196* (2006.01)
  *G08B 15/00* (2006.01)
  *H04N 7/18* (2006.01)

(56) References Cited

U.S. PATENT DOCUMENTS

| | | |
|---|---|---|
| 2018/0220506 A1 | 8/2018 | Sadwick |
| 2019/0045602 A1 | 2/2019 | Chen |
| 2020/0358925 A1* | 11/2020 | Hall .................... H04N 7/181 |
| 2023/0281997 A1* | 9/2023 | Merkley .......... G08B 13/19613 |
| | | 340/541 |

FOREIGN PATENT DOCUMENTS

| | | |
|---|---|---|
| WO | 2013052383 A1 | 4/2013 |
| WO | 2017118647 A1 | 7/2017 |
| WO | 2018019553 A1 | 2/2018 |
| WO | 2019005916 A1 | 1/2019 |

OTHER PUBLICATIONS

"4 Benefits of IR Lights for Security Cameras," Iluminar (https://www.iluminarinc.com), 2019 (3 Pages).

"Ways to Use a White or Infrared Security Light," Iluminar (https://www.iluminarinc.com), 2019 (3 Pages).

"Univivi U06R IR Illuminator Review," Network Camera Tech, https://networkcameratech.com, Last Visited Aug. 2022 (18 Pages).

* cited by examiner

SELECTING A LIGHT SOURCE FOR ACTIVATION BASED ON A TYPE AND/OR PROBABILITY OF HUMAN PRESENCE

CROSS-REFERENCE TO PRIOR APPLICATIONS

This application is the U.S. National Phase application under 35 U.S.C. § 371 of International Application No. PCT/EP2021/055536, filed on Mar. 5, 2021, which claims the benefit of European Patent Application No. 20161412.0, filed on Mar. 6, 2020. These applications are hereby incorporated by reference herein.

FIELD OF THE INVENTION

The invention relates to a system for activating an infrared light source.

The invention further relates to a method of activating an infrared light source.

The invention also relates to a computer program product enabling a computer system to perform such a method.

BACKGROUND OF THE INVENTION

There is a rapid growth in camera surveillance, also in the consumer domain, as a result of IP/Wi-Fi cameras having become compact and relatively cheap. The night vision mode on cameras uses infrared (IR) light to invisibly illuminate the monitored area. This enables unnoticeable camera monitoring without creating any light pollution.

Cameras are rapidly becoming more sophisticated. For instance, some cameras have a wide or 360 degrees field-of-view angle. This larger field-of-view inherently means that the accompanying IR illumination must also cover this wider area. Night vision cameras usually have multiple IR LEDs mounted around the lens, to generate the infrared light towards the monitored area. However, a highly concentrated beam of IR located at the position of the camera will cause washing out of parts of the image, while not illuminating other parts.

Given the wide field-of-view, IR lights which are located remote from the camera are necessary to generate a proper night vision view across a larger monitored area. Being able to illuminate from different angles and positions will significantly increase overall image quality. Infrared light sources which are external to the camera device are disclosed in WO 2013/052383 A1, for example.

WO 2013/052383 A1 discloses a smart surveillance camera system of which a processor is configured to generate control signals to activate/deactivate or otherwise control operation of IR illuminators, visible light illuminators and/or a visible/NIR light camera based the detection and determination of a presence, type and/or other attributes of an object of interest in the surveillance scene. For example, the visible light illuminators may be controlled if a person is detected and the IR illuminators may be controlled if an animal is detected.

WO 2013/052383 A1 further discloses that a user is able to make an association between a detected object type and corresponding illumination/monitoring operations, e.g. if the user prefers IR illuminators to turn on instead of visible light illuminators so that people can be monitored without drawing their attention. However, the user has to configure which type of light source should be activated when human presence is detected, which makes the system behave sub optimally.

EP 2764686 B1 discloses a smart surveillance camera system including a thermal imager, a visible/NIR light camera, one or more IR illuminators, one or more visible light illuminators, a processor and a communication module. Users may configure the camera system to perform specific illumination and recording operations according to the types of the detected objects. The thermal imager and/or processor may detect and discern animals, vehicles or other objects of interest in scene by detecting and analyzing objects having temperatures typical for objects of interest.

SUMMARY OF THE INVENTION

It is a first object of the invention to provide a system, which is able to select a light source for activation in response to human presence detection in a smart manner.

It is a second object of the invention to provide a method, which is able to select a light source for activation in response to human presence detection in a smart manner.

In a first aspect of the invention, a system for activating an infrared light source comprises at least one input interface, at least one control interface, and at least one processor configured to receive, via said at least one input interface, input indicating human presence in a space, determine a type and/or probability of said human presence based on said input, decide whether to activate an infrared light source or a visible-light light source in said space based on said type and/or probability of said human presence, and activate, via said at least one control interface, said infrared light source or said visible-light light source in dependence on said decision.

By letting the system decide whether to activate an infrared light source or a visible-light light source based on the type and/or probability of the human presence, it becomes possible to only activate the visible-light light source when the detected person is a known or trusted person and/or when the probability that a (e.g. known or trusted) person has been detected is sufficiently high. This smart selection of a light source to be activated in response to human presence detection may be used to illuminate one or more important areas for occupants of a space, e.g. an area with a door and/or an area with pavement, but only when needed. By not unnecessarily activating the visible-light light source(s), the amount of disturbance to occupants and/or their neighbors may be reduced.

By activating the infrared light source when human presence has been detected but it is not desirable to activate the visible-light light source, intruders can still be recorded/monitored by a camera. As an additional advantage, the intruders are not aware that they are being recorded/monitored. The infrared light source(s), e.g. IR LEDs, may be integrated into a (regular) illumination device or a presence/motion detection device, for example. The infrared light source(s) may be integrated in a device separate from the camera to help ensure that the range of the infrared light source(s) is sufficient to cover (almost) every area and or angle with the camera. The human presence sensing may be enabled by separate or lamp-integrated presence sensing means (e.g. RF-based, microphone, or PIR), for example.

Said system may be a lighting device which comprises said infrared light source and said visible-light light source. For example, if regular lamps are equipped with integrated IR LEDs, those can enable high-quality night vision for surveillance cameras. In order to save energy, the IR LEDs (and optionally the camera) only need to be activated if presence is detected.

The system may be part of a smart home system in which smart lighting devices (comprising RF-based presence sensing) or motion/presence sensors with integrated IR light source(s) are combined with (WiFi) security cameras, for example. Alternatively, the system may be part of an office lighting system that comprises luminaires with integrated presence sensing (e.g. using microwave sensors) and IR LEDs (e.g. used for IR LiFi during daytime), for example. Alternatively, the system may be incorporated into streetlights which comprise an integrated surveillance camera and a simple presence sensor, for example.

Said at least one processor may be configured to perform person identification based on said input and/or based on further input and determine said type of said human presence by determining whether said person identification resulted in a known and/or trusted person being identified. This makes it possible to only active the visible-light light source when a known and/or trusted person has been identified and to activate the infrared light source when a different type of human presence has been detected. The infrared light source is sufficient to record/monitor intruders (intruders do not need to be helped to find their way) and may make the camera more difficult for intruders to notice (due to the absence of visible light). The further input may be received from a further device, for instance from a personal mobile device.

Said at least one processor may be configured to receive, via said at least one input interface, one or more signals from one or more personal mobile devices, said one or more signals comprising one or more user identifications, and perform said person identification based on said one or more signals. This enables person identification in a relatively simple manner. The one or more signals may be Bluetooth signals, for example.

Said at least one processor may be configured to determine, via said at least one input interface, one or more characteristics of a set of received radio frequency signals, and perform said person identification based on said one or more characteristics of said set of received radio frequency signals. This enables person identification without requiring every known or trusted person to carry a personal mobile device and without requiring personal mobile devices to be configured to transmit user identifications.

Said at least one processor may be configured to determine an ambient light level via said at least one input interface, determine whether said ambient light level exceeds a light threshold, and activate said infrared light source or said visible-light light source in dependence on said decision upon determining that said ambient light level does not exceed said light threshold. By only activating an artificial light source when the natural light is not sufficient, energy may be saved.

Said at least one processor may be configured to decide to activate said infrared light source upon determining that said probability of said human presence exceeds a first threshold and does not exceed a second threshold and decide to activate said visible-light light source upon determining that said probability of said human presence exceeds said second threshold. The infrared light may be used to perform better human presence detection if the initial human presence detection was not conclusive, for example.

For instance, said at least one processor may be configured to obtain, via said at least one input interface, infrared camera images from a camera device, said infrared camera images being captured while said infrared light source is emitting light, perform further human presence detection based on said infrared camera images, decide whether to activate said visible-light light source based on said further human presence detection, and activate, via said at least one control interface, said visible-light light source based on said decision whether to activate said visible-light light source. This may be used to prevent unnecessary activation of the visible-light light source(s), and flickering in particular, which may unnecessarily disturb occupants or their neighbors.

If the further human presence detection results in the detection of a human, but the detected human cannot be identified, the visible-light light source may be flashed or flickered in order to deter the (likely) intruder, while leaving the infrared light source on continuously to enable capture of continuous video even though the visible-light light source is flashing or flickering.

Said at least one processor may be configured to identify one or more infrared light sources within a certain distance of a device with a camera and select said infrared light source by selecting at least one infrared light source from said one or more infrared light sources. The one or more infrared light sources may be identified based on received signal strengths as measured by the device with the camera, for example.

Alternatively or additionally, said at least one processor may be configured to identify one or more infrared light sources in a field of view of a camera and select said infrared light source by selecting at least one infrared light source from said one or more infrared light sources. For example, during configuration, the camera may detect a (visible or infrared) lighting identifier emitted by the lighting device. This may be achieved by modulating the light of each light source or by sequentially activating individual light sources during the configuration process, for example. Optionally, the IR output of the lighting device may be automatically adjusted such that maximal illumination of the full image is achieved without white-washing.

Said at least one processor may be configured to activate said camera or a camera function in dependence on said decision whether to activate said infrared light source. This is beneficial if the camera does not record continuously.

Said at least one processor may be configured to decide whether to activate a group of infrared light sources in said space based on said type and/or probability of said human presence, said group comprising a plurality of light sources, and activate and deactivate, via said at least one control interface, each of said group of infrared light sources in sequence in dependence on said decision whether to activate said group of infrared light sources. This temporal control (subsequent activation) of the IR light sources may be used in order to generate an improved image of a detected object (e.g. intruder).

In a second aspect of the invention, a method of activating an infrared light source comprises receiving input indicating human presence in a space, determining a type and/or probability of said human presence based on said input, deciding whether to activate an infrared light source or a visible-light light source in said space based on said type and/or probability of said human presence, and activating said infrared light source or said visible-light light source in dependence on said decision. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations for activating an infrared light source.

The executable operations comprise receiving input indicating human presence in a space, determining a type and/or probability of said human presence based on said input, deciding whether to activate an infrared light source or a visible-light light source in said space based on said type and/or probability of said human presence, and activating said infrared light source or said visible-light light source in dependence on said decision.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
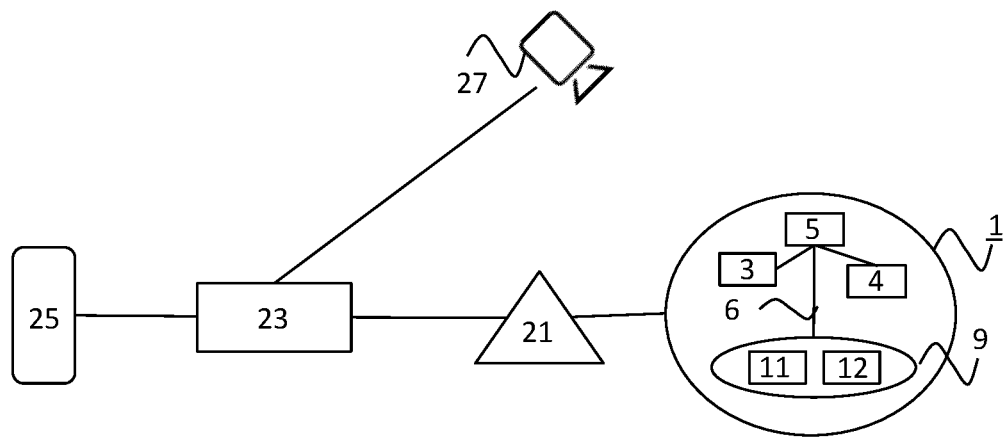
FIG. 1 is a block diagram of a first embodiment of the system.

FIG. 1 shows a first embodiment of the system for activating an infrared light source: a lighting device 1. The lighting device 1 comprises a receiver 3, a transmitter 4, a processor 5, a LED module 9 and a control interface 6 between the processor 5 and the LED module 9. The LED module 9 comprises a plurality of LEDs: a visible-light LED 11 and an IR LED 12.

The processor 5 is configured to receive, via the receiver 3, input indicating human presence in the same space as the lighting device 1, determine a type and/or probability of the human presence based on the input, decide whether to activate the IR LED 12 or the visible-light LED 11 based on the type and/or probability of the human presence, and activate, via the control interface 6, the IR LED 12 or the visible-light LED 11 in dependence on the decision.

The input may be received from a separate presence or motion sensor or the receiver 3 may be used to perform RF-based sensing, for example. The separate presence or motion sensor may use IR sensing, for example. For instance, low brightness energy saving IR may be used to detect presence and then bright IR may be used for camera vision.

The processor 5 may be configured to activate a camera device 27 or a camera function of the camera device 27 in dependence on the decision whether to activate the IR LED 12 or the visible-light LED 11. In the example of FIG. 1, the camera device 27 is connected to a wireless LAN access point 23, e.g. using Wi-Fi, a (light) controller 21 is also connected to the wireless LAN access point 23, e.g. using Wi-Fi or Ethernet, and the lighting device 1 is connected to the controller 21, e.g. using Zigbee. The lighting device 1 is able to communicate with the camera device 27 via the controller 21 and the wireless LAN access point 23. The controller 21 may be a Philips Hue bridge, for example.

In the example of FIG. 1, a mobile device 25 is also connected to the wireless LAN access point 23, e.g. via Wi-Fi. The mobile device 25 may run an app for controlling the lighting device 1, for example. The mobile device 25 may be able to control the lighting device via the wireless LAN access point 23 and the controller 21 and/or directly, e.g. using Bluetooth. The mobile device 21 may also transmit a signal comprising a user identification, e.g. using Bluetooth. The lighting device 1 may be configured to use this signal to perform person identification.

The LEDs 11-12 may be direct emitting or phosphor converted LEDs. The visible-light LED 11 may be a white LED, for example. In the embodiment of FIG. 1, the LED module 9 comprises only one visible-light LED 11. In an alternative embodiment, the LED module 9 comprises multiple visible-light LEDs, e.g. a red LED, a green LED, a blue LED and optionally a white LED. In the embodiment of FIG. 1, the LED module 9 comprises only one IR LED 12. In an alternative embodiment, the LED module 9 comprises multiple IR LEDs.

In the embodiment of the lighting device 1 shown in FIG. 1, the lighting device 1 comprises one processor 5. In an alternative embodiment, the lighting device 1 comprises multiple processors. The processor 5 of the lighting device 1 may be a general-purpose processor or an application-specific processor. The receiver 3 and the transmitter 4 may use one or more wireless communication technologies. e.g. Zigbee, for communicating with the controller 21. In an alternative embodiment, multiple receivers and/or multiple transmitters are used instead of a single receiver and a single transmitter.

In the embodiment shown in FIG. 1, a separate receiver and a separate transmitter are used. In an alternative embodiment, the receiver 3 and the transmitter 4 are combined into a transceiver. The lighting device 1 may comprise other components typical for a connected lighting device such as a power connector and a memory. In an alternative embodiment, the lighting device 1 is not a connected lighting device. The invention may be implemented using a computer program running on one or more processors.

In the embodiment of FIG. 1, the system of the invention is a lighting device. In an alternative embodiment, the system of the invention is a different device, e.g. a mobile device or a controller. In the embodiment of FIG. 1, the system of the invention comprises a single device. In an alternative embodiment, the system of the invention comprises a plurality of devices.

Figure 2:
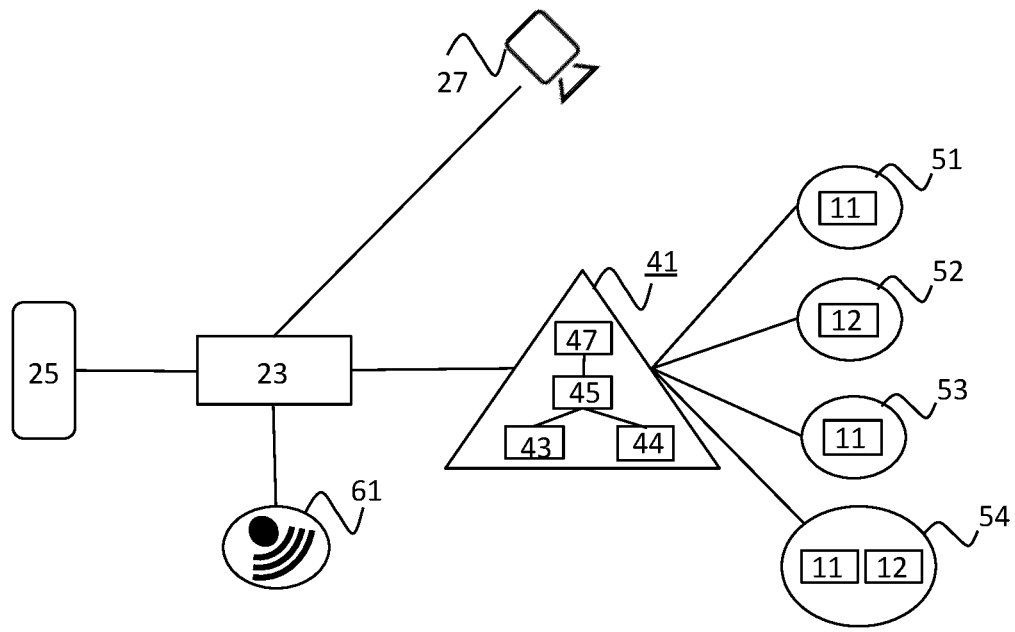
FIG. 2 is a block diagram of a second embodiment of the system.

FIG. 2 shows a second embodiment of the system for activating an infrared light source: a controller 41, e.g. a bridge or a gateway. In the example of FIG. 2, the controller 41 controls four lighting devices 51-54. In the example of FIG. 2, lighting devices 51 and 53 each comprise a visible-light LED 11, lighting device 52 comprises an IR LED 12, and lighting device 54 comprises both a visible-light LED 11 and an IR LED 12.

The controller 41 comprises a receiver 43, a transmitter 44, a processor 45, and memory 47. The processor 45 is configured to receive, via the receiver 43, input indicating human presence in a space, determine a type and/or probability of the human presence based on the input, decide whether to activate an infrared light source or a visible-light light source in the space based on the type and/or probability of the human presence, and activate, via the transmitter 44, the infrared light source (e.g. of lighting devices 52 and/or 54) or the visible-light light source (e.g. of lighting devices 51, 53 and/or 54) in dependence on the decision.

In the embodiment of FIG. 2, the processor 45 is configured to receive light level information from a light sensor 61 via the receiver 43, determine an ambient light level from the received light level information, determine whether the ambient light level exceeds a light threshold, and activate the infrared light source or the visible-light light source in dependence on the decision upon determining that the ambient light level does not exceed the light threshold. In the example of FIG. 2, the light sensor 61 is connected to the wireless LAN access point 23.

In the embodiment of FIG. 2, the processor 45 is configured to identify one or more infrared light sources in a field of view of the camera of camera device 27 or within a certain distance of camera device 27 and select the infrared light source by selecting at least one infrared light source from the one or more infrared light sources. A light source may be determined to be in the field of view of a camera when a lighting device comprising the light source or a light effect rendered by the light source can be recognized in an image captured by the camera. A light effect may be recognized in an image, for example, when the light source transmits an identifier coded in the light. In the embodiment of FIG. 2, the processor 45 is configured to activate the camera of camera device 27 in dependence on the decision whether to activate the infrared light source or the visible-light light source.

For example, when both IR LED 12 of lighting device 52 and IR LED 12 of lighting device 54 are in the field of view of the camera of camera device 27, then these light sources are both identified, and at least one these light sources is selected. If it is decided to activate an infrared light source, the selected light source(s) are then activated by transmitting a suitable command to lighting device 52 or 54. The same principle may be used to identify one or more visible-light light sources. For example, when visible-light LED 11 of lighting device 54 is in the field of view of camera, then this light source is identified, e.g. using a Visible Light Communication (VLC) identifier, and selected. If it is decided to activate a visible-light light source, the selected light source is then activated by transmitting a suitable command to lighting device 54.

Figure 3:
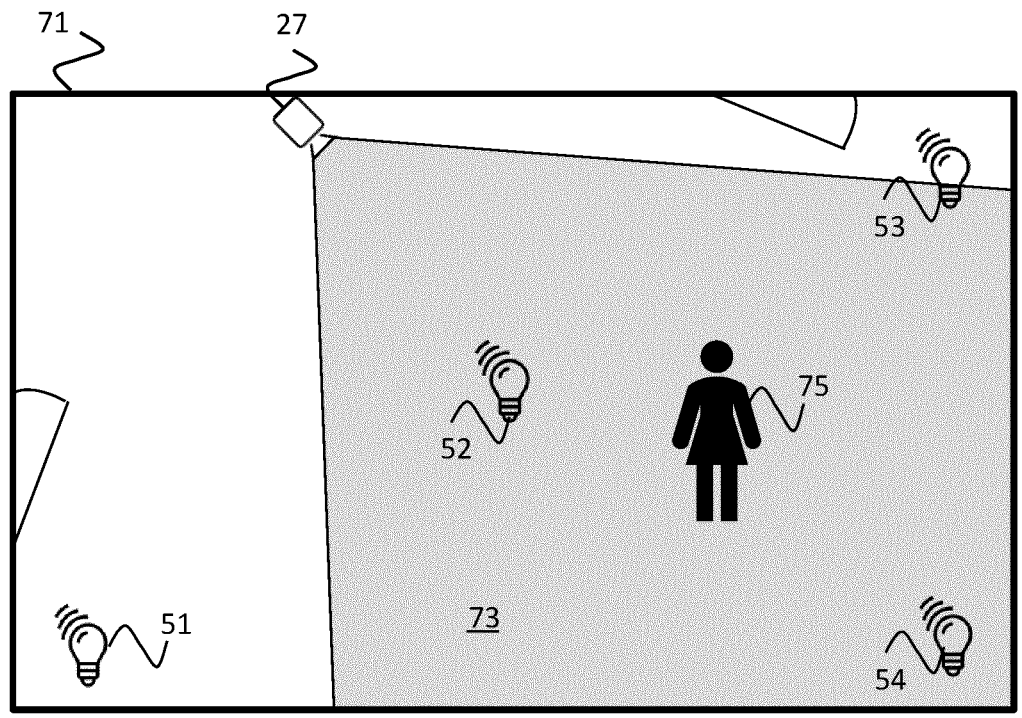
FIG. 3 depicts an example of a space comprising the camera and lighting devices of FIG. 2.

The example described in the previous paragraph is depicted in FIG. 3. FIG. 3 depicts an example of a space 71 comprising the camera device 27 and lighting devices 51-54 of FIG. 2. Lighting devices 52-54 are inside the field of view 73 of the camera of camera device 27 and lighting device 51 is outside the field of view of the camera of camera device 27. During configuration, the camera detects lighting identifiers from lighting devices 52-54 in its field of view.

At night (when the lights are off or low) the camera and the IR LEDs in those lighting devices are activated upon detecting presence, e.g. of person 75, in the monitored area based on the type and/or probability of the human presence detection. If the processor 45 decides to activate an infrared light source and the IR LEDs of both lighting device 52 and lighting device 54 are selected, the processor 45 may activate the IR LEDs of both lighting devices at the same time or activate and deactivate each IR LED in sequence.

In the embodiment of the controller 41 shown in FIG. 2, the controller 41 comprises one processor 45. In an alternative embodiment, the controller 41 comprises multiple processors. The processor 45 of the controller 41 may be a general-purpose processor, e.g. ARM-based, or an application-specific processor. The processor 45 of the controller 41 may run a Unix-based operating system for example. The memory 47 may comprise one or more memory units. The memory 47 may comprise one or more hard disks and/or solid-state memory, for example.

The receiver 43 and the transmitter 44 may use one or more wired or wireless communication technologies such as Zigbee to communicate with the lighting devices 51-54 and Ethernet to communicate with the wireless LAN access point 23, for example. In an alternative embodiment, multiple receivers and/or multiple transmitters are used instead of a single receiver and a single transmitter. In the embodiment shown in FIG. 2, a separate receiver and a separate transmitter are used. In an alternative embodiment, the receiver 43 and the transmitter 44 are combined into a transceiver. The controller 41 may comprise other components typical for a controller such as a power connector. The invention may be implemented using a computer program running on one or more processors.

Figure 4:
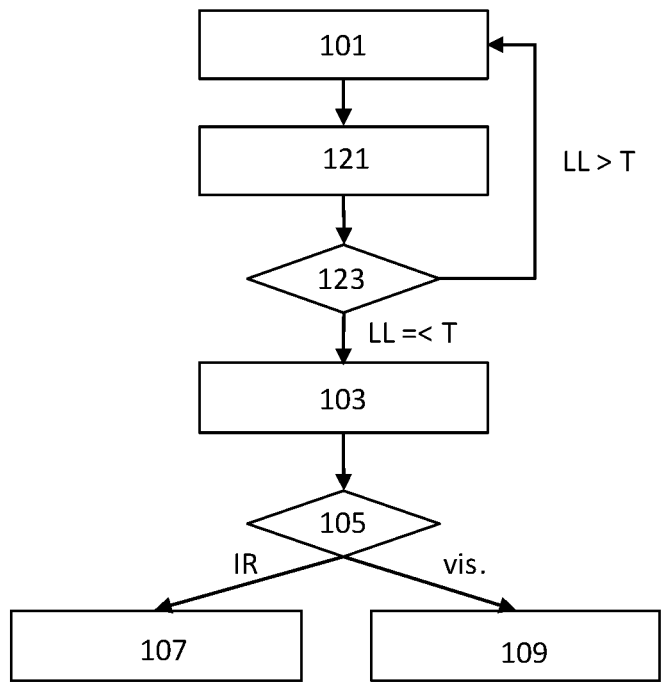
FIG. 4 is a flow diagram of a first embodiment of the method.

A first embodiment of activating an infrared light source is shown in FIG. 4. A step 101 comprises receiving input indicating human presence in a space, e.g. at night when the lights are off or very low. This may be done by means of a separate presence or motion sensor, or it may be done by presence-detection means integrated into the lighting devices (e.g. integrated microwave sensor, microphone, or RF-based sensing), for example.

A step 121 comprises determining an ambient light level. A step 123 comprises determining whether the ambient light level LL exceeds a light threshold T. If it is determined in step 123 that the ambient light level LL does not exceed the light threshold T, a step 103 is performed. If it is determined in step 123 that the ambient light level LL exceeds the light threshold T, step 101 is repeated and the method then proceeds as shown in FIG. 4.

Step 103 comprises determining a type and/or probability of the human presence based on the input received in step 101. Next, a step 105 comprises deciding whether to activate an infrared light source or a visible-light light source in the space based on the type and/or probability of the human presence determined in step 103. If the decision is made in step 105 to activate an infrared light source, a step 107 is performed. Step 107 comprises activating the infrared light source.

Optionally, a suitable intensity of the individual IR LEDs is determined during the configuration phase. In more advanced embodiments, besides presence, also a presence position or movement direction may be determined, and the IR light sources may be controlled according to this position. If the decision is made in step 105 to activate a visible-light light source, a step 109 is performed. Step 109 comprises activating the visible-light light source.

Figure 5:
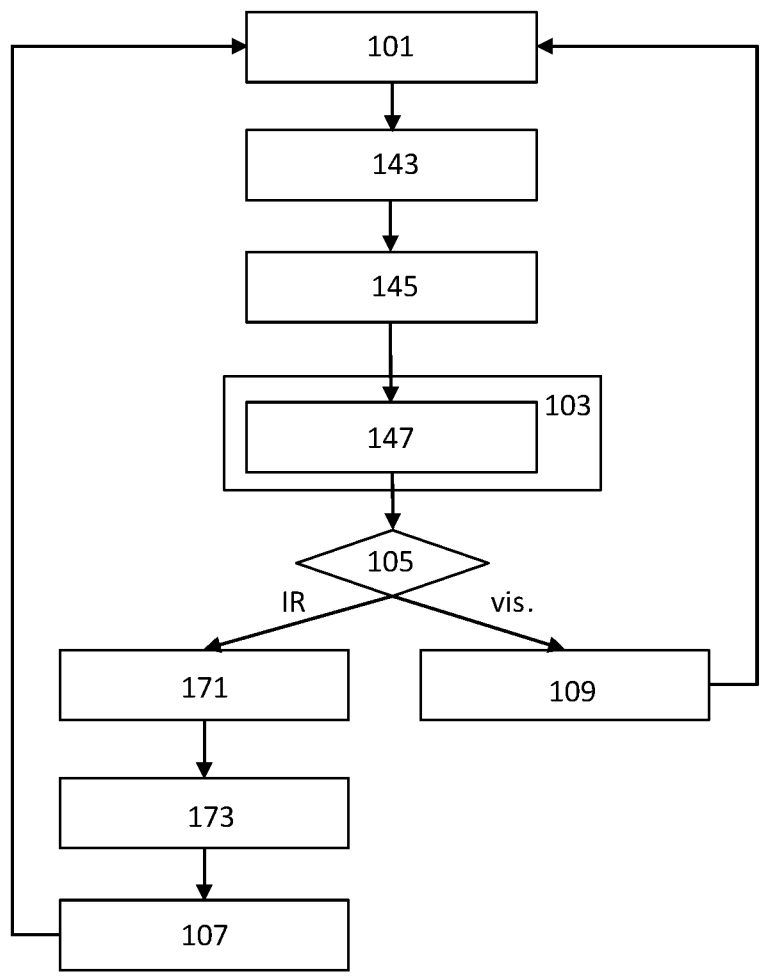
FIG. 5 is a flow diagram of a second embodiment of the method.

A second embodiment of activating an infrared light source is shown in FIG. 5. Step 101 comprises receiving input indicating human presence in a space. This may be done by means of a separate presence or motion sensor, or it may be done by presence-detection means integrated into the lighting devices (e.g. integrated microwave sensor, microphone, or RF-based sensing), for example.

Next, a step 143 comprises receiving one or more signals from one or more personal mobile devices, if these one or more signals are being transmitted. A personal mobile device may be a smartphone, a wearable device (e.g. a smartwatch), an electronic key, or an electronic vehicle (e.g. an e-bike or a smart car), for example. These one or more signals, if received, comprise one or more user identifications. If it is determined in step 145 from the input received in step 101 that a human is present, then the one or more user identifications received in step 143, if any, are provided as result of step 145. Optionally, only the user identification(s) received in a signal with a received signal strength exceeding a certain threshold are provided as result.

In the embodiment of FIG. 5, step 103 of FIG. 4 is implemented by a step 147. Step 147 is performed after step 145 and comprises determining the type of the human presence by determining whether the person identification of step 145 resulted in a known and/or trusted person being identified, e.g. by comparing an identifier of the detected human with a list of identifiers of known or trusted persons. In the embodiment of FIG. 5, the probability of the human presence is not determined.

Next, a step 105 comprises deciding whether to activate an infrared light source or a visible-light light source in the space based on the type of the human presence determined in step 147. In the embodiment of FIG. 5, it is detected in step 105 to activate a visible-light light source when the person the person identification of step 145 resulted in a known and/or trusted person being identified and an infrared light source if not.

If the decision is made in step 105 to activate an infrared light source, a step 171 is performed. Step 171 comprises identifying one or more infrared light sources within a certain distance of a device with a camera. For instance, the camera device and the lighting devices may be RF devices and the lighting devices nearby the camera device may be determined based on RSSI. In an alternative embodiment, a user is able to explicitly indicate which lighting devices are near the camera device or assign both the lighting devices and the camera device to the same (room) group.

A step 173 comprises selecting at least one infrared light source from the one or more infrared light sources. Optionally, the specific type of the light source and/or light fixture may be used to prioritize one light source over the other. Next, step 107 comprises activating the infrared light source selected in step 173. If the decision is made in step 105 to activate a visible-light light source, a step 109 is performed. Step 109 comprises activating the visible-light light source. Step 141 is repeated after step 107 or step 109 has been performed and the method then proceeds as shown in FIG. 5.

Figure 6:
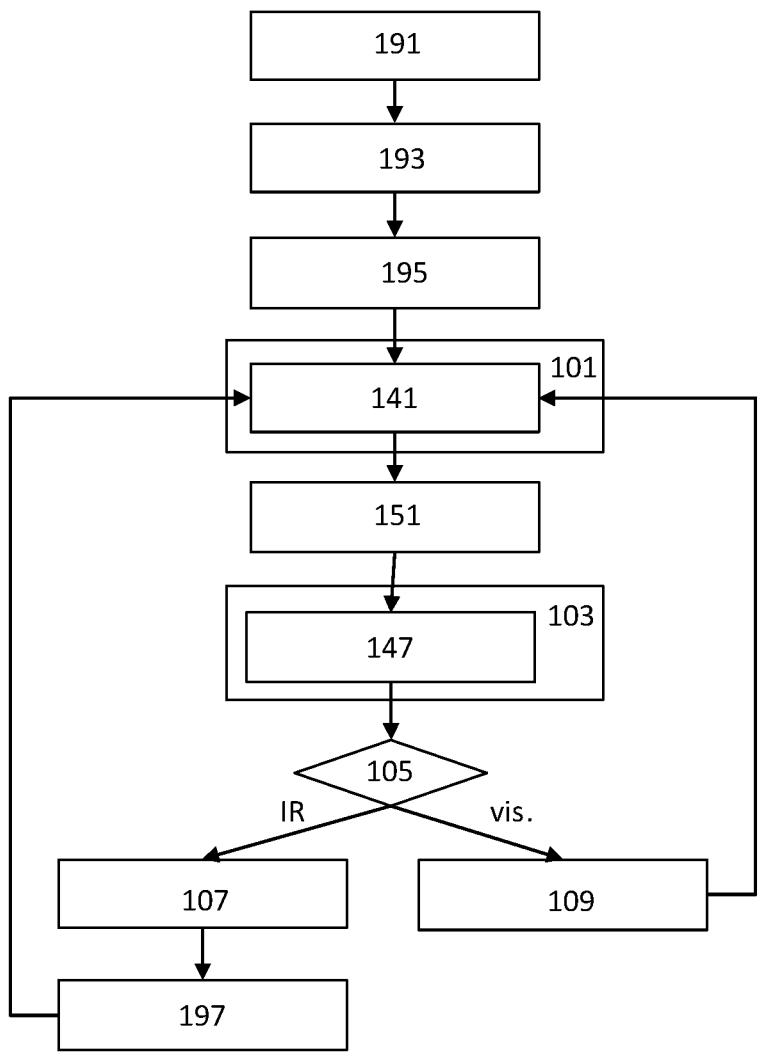
FIG. 6 is a flow diagram of a third embodiment of the method.

A third embodiment of activating an infrared light source is shown in FIG. 6. A step 191 comprises obtaining one or more images captured by a camera that is sensitive to infrared wavelengths, e.g. a camera with an infrared filter. A step 193 comprises identifying one or more infrared light sources in a field of view of the camera. Infrared light sources which are able to generate a (direct or indirect) effect in the camera's field of view may be determined using coded light (e.g. visible light communication), for example.

For instance, by modulating the visible or infrared light sources of the lighting device, camera-detectable identifiers can be emitted. The modulation may either be active continuously or only during a configuration stage. An advantage of this approach that not only light sources in the direct view of the camera but also those generating their effect in the camera's field of view can be identified. Instead of using coded light, the system can be commissioned during the dark time of the day by switching on and off light sources present in the same area as the camera ("dark room calibration").

Step 195 comprises selecting at least one infrared light source from the one or more infrared light sources identified in step 193. In an alternative embodiment, steps similar to steps 191-195 are performed to select at least one visible-light light source.

Step 101 comprises receiving input indicating human presence in a space. In the embodiment of FIG. 6, step 101 is implemented by a step 141. Step 141 comprises determining one or more characteristics of a set of received radio frequency signals, i.e. performing RF-based sensing. The one or more characteristics may comprise signal strength and/or Channel State Information (CSI) of the set of received radio frequency signals, for example.

Next, a step 151 comprise performing person identification based on the one or more characteristics of the set of received radio frequency signals determined in step 141. Step 151 comprises comparing the one or more characteristics of the set of received radio frequency signals, determined in step 141, with one or more of corresponding characteristics of a reference set of radio frequency signals and performing the person identification based on the differences. The differences are used to determine properties of the detected person, e.g. the dimensions of the person, gait of the person and/or route walked by the person. These properties are compared with the properties of known and/or trusted persons, which are associated with person identifiers, and if there is a match, an identifier of the detected person is provided. A calibration procedure typically needs to be performed to establish the gait and usual normal walking routes of a known or trusted person.

Step 147 is performed after step 151 and comprises determining the type of the human presence by determining whether the person identification of step 151 resulted in a known and/or trusted person being identified. In the embodiment of FIG. 6, the probability of the human presence is not determined.

Next, a step 105 comprises deciding whether to activate the infrared light source(s) or a visible-light light source in the space based on the type of the human presence determined in step 147. In the embodiment of FIG. 6, it is decided in step 105 to activate a visible-light light source when the person identification of step 145 resulted in a known and/or trusted person being identified and to activate the infrared light source(s) if not.

If the decision is made in step 105 to activate the infrared light source(s), step 107 is performed. Step 107 comprises activating the infrared light source(s) selected in step 173. In the embodiment of FIG. 6, a step 197 is performed next. Step 197 comprises activating the camera or a camera function. As a result, the camera device may switch from a standby to operational mode or switches from an energy-saving mode to a normal mode, for example. In an alternative embodiment, the camera continuously records/monitors the space. For example, the camera may continuously record/monitor the space using only its light source(s) and/or external light sources in a dimmed state (e.g. with illumination level enough to detect motion), and after motion is detected, the external IR light sources are activated to full power such that the source of motion is better visible to the camera.

If the decision is made in step 105 to activate a visible-light light source, step 109 is performed. Step 109 comprises activating the visible-light light source. Step 141 is repeated after step 197 or step 109 has been performed and the method then proceeds as shown in FIG. 6.

Figure 7:
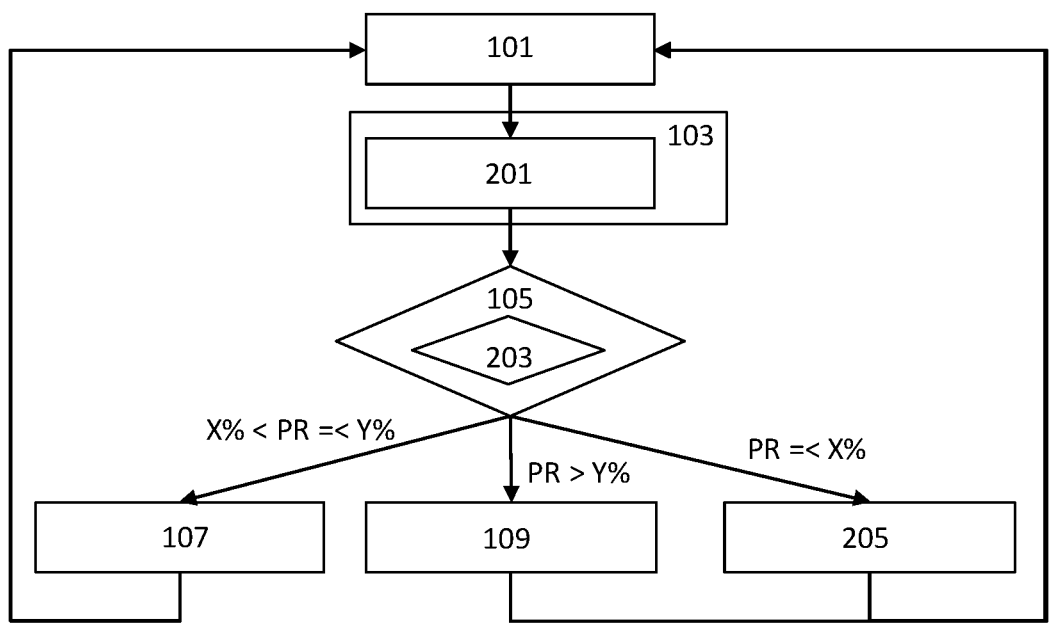
FIG. 7 is a flow diagram of a fourth embodiment of the method.

A fourth embodiment of activating an infrared light source is shown in FIG. 7. Step 101 comprises receiving input indicating human presence in a space. In the embodiment of FIG. 7, step 103 of FIG. 4 is implemented by a step 201. Step 201 is performed after step 101 and comprises determining a probability PR of the human presence based on the input received in step 101, e.g. by using RF-based sensing. In the embodiment of FIG. 7, a type of the human presence is not determined.

Next, a step 105 comprises deciding whether to activate an infrared light source or a visible-light light source in the space based on the probability PR determined in step 201. In the embodiment of FIG. 7, step 105 is implemented by a step 203. Step 203 comprises comparing the probability PR with a first threshold (X %) and a second threshold (Y %) and deciding to activate the infrared light source upon determining that the probability PR exceeds the first threshold (X %) and does not exceed the second threshold (Y %) and deciding to activate the visible-light light source upon determining that the probability PR exceeds the second threshold (Y %).

In a variation on this embodiment, if the visible-light light source is already on, then it is only decided in step 203 to deactivate the visible-light light source, e.g. to activate the infrared light source, if the probability has been lower than the second threshold a predetermined amount of time, to prevent frequent activations and deactivations of the visible-light light source.

If the decision is made in step 105 to activate an infrared light source, step 107 is performed. Step 107 comprises activating the infrared light source if not already on and deactivating the visible-light light source if on. If the decision is made in step 105 to activate a visible-light light source, step 109 is performed. Step 109 comprises activating the visible-light light source if not already on and deactivating the infrared light source if on. If it is determined in step 203 that the probability PR does not exceed the first threshold (X %), a step 205 is performed. Step 205 comprises deactivating the infrared light source if it is on and deactivating the visible-light light source if it is on. Step 101 is repeated after step 107, step 109 or step 205 has been performed and the method then proceeds as shown in FIG. 7.

Figure 8:
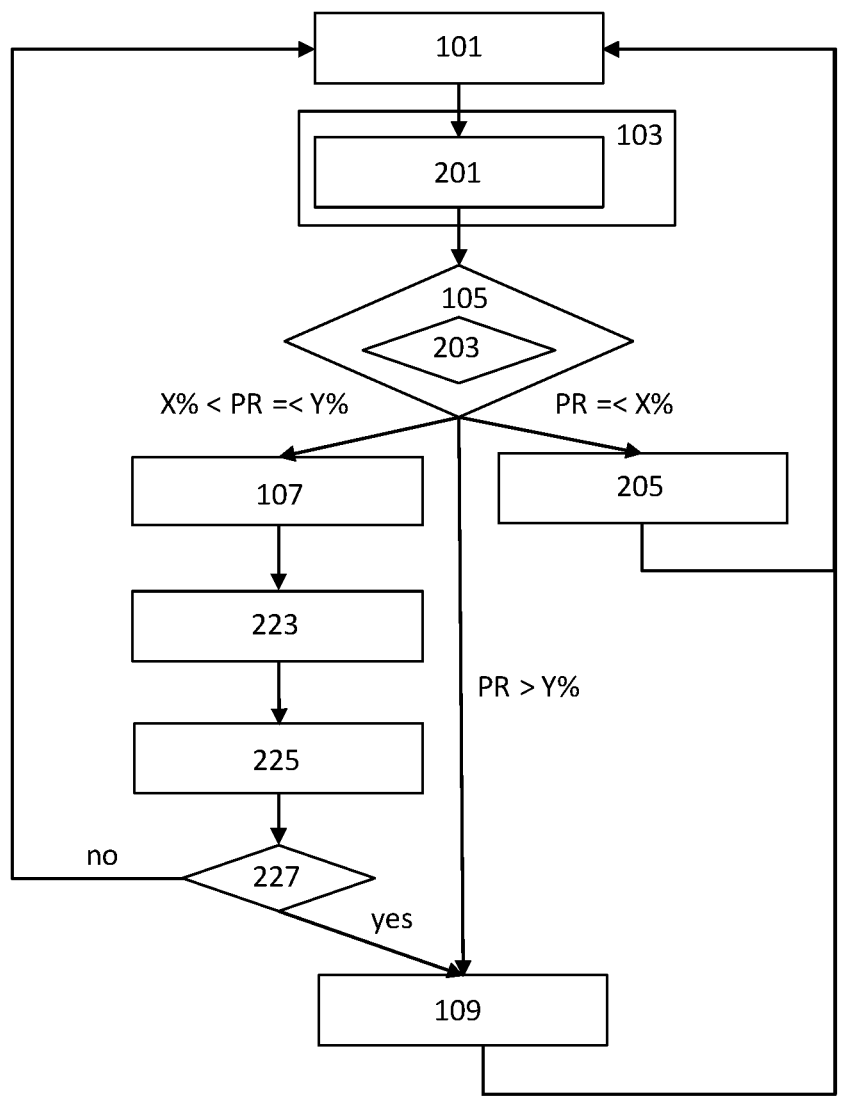
FIG. 8 is a flow diagram of a fifth embodiment of the method.

A fifth embodiment of activating an infrared light source is shown in FIG. 8. This fifth embodiment is an extension of the fourth embodiment of FIG. 7. A step 223 is performed after step 107, i.e. after an infrared light source has been activated. Step 223 comprising obtaining infrared camera images from a camera device. The infrared camera images are captured while the infrared light source is emitting light. A step 225 comprises performing further human presence detection based on the infrared camera images obtained in step 223. In the embodiment of FIG. 8, the result of step 225 is binary: either human presence is detected or it is not. In an alternative embodiment, the result of step 225 is again a probability.

A step 227 comprises deciding whether to activate the visible-light light source based on the further human presence detection performed in step 225. In step 227, it is decided to activate the visible-light light source if the result of step 225 is that human presence has been detected. If the decision is made in step 227 to activate the visible-light light source, step 109 is performed. Step 109 comprises activating the visible-light light source. If the decision is made in step 227 not to activate the visible-light light source, step 101 is repeated and the method proceeds as shown in FIG. 8.

In the embodiment of FIG. 8, the input may be received from a simple (e.g. single pixel) IR sensor in step 101, for example. The benefit of using simple IR sensing is that it does not consume much energy. If the probability PR determined using simple IR sensing exceeds X % and does not exceed Y %, the infrared light source is activated to allow (IR) camera vision to be used for better presence detection results.

In a variation on this embodiment, step 107 is only performed if the visible-light light source is off. If the visible-light light source is already on and the determined probability PR exceeds the first threshold (X %) and does not exceed the second threshold (Y %), the visible-light light source may be kept on.

In a variation on the embodiment of FIG. 8, steps 223 and 225 are omitted, i.e. no further presence detection is performed based on infrared camera images. In this variation, step 227 is replaced with a step in which it is determined how long on end presence has been detected and if presence is still detected after some predefined time duration (e.g. the probability PR determined in step 201 exceeds X % and does not exceed Y % in a predefined number of successive iterations), step 109 is performed. If presence has not been detected for the predefined time duration yet, step 101 is repeated.

The embodiments of FIGS. 4 to 8 differ from each other in multiple aspects, i.e. multiple steps have been added or replaced. In variations on these embodiments, only a subset of these steps is added or replaced and/or one or more steps is omitted. For example, steps 121 and 123 may be omitted from the embodiment of FIG. 4 and/or added to the embodiments of FIGS. 5 to 8 and/or the embodiments of FIGS. 5 and 6 may each be combined with the embodiment of FIG. 7 or FIG. 8.

Figure 9:
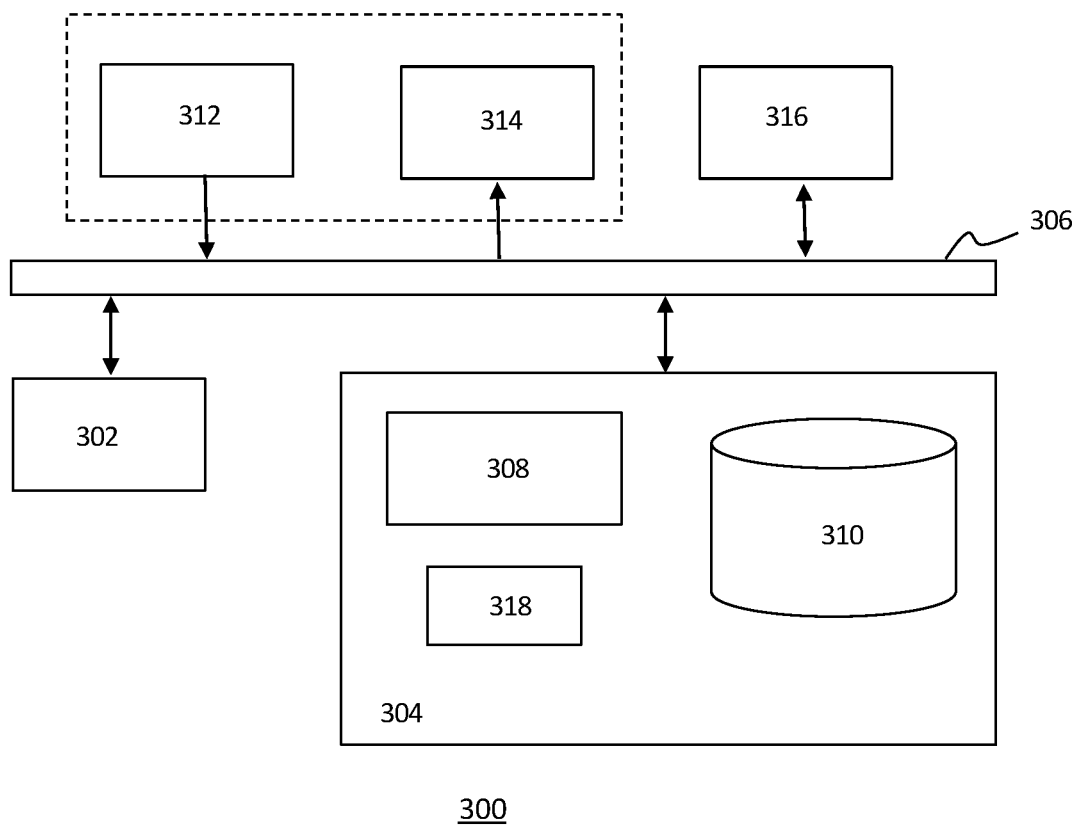
FIG. 9 is a block diagram of an exemplary data processing system for performing the method of the invention.

FIG. 9 depicts a block diagram illustrating an exemplary data processing system that may perform the method as described with reference to FIGS. 4 to 8.

As shown in FIG. 9, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 9 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 9, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 9) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

FIG. 9 shows the input device 312 and the output device 314 as being separate from the network adapter 316. However, additionally or alternatively, input may be received via the network adapter 316 and output be transmitted via the network adapter 316. For example, the data processing system 300 may be a cloud server. In this case, the input may be received from and the output may be transmitted to a user device that acts as a terminal.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A system for activating an infrared light source or a visible-light light source, said system comprising:
   at least one input interface;
   at least one control interface; and
   at least one processor configured to:
   receive, via said at least one input interface, input indicating human presence in a space,
   perform person identification based on said input and/or based on further input,
   determine a type of said human presence based on said input by determining whether said person identification resulted in a known and/or trusted person being identified,
   decide whether to activate an infrared light source or a visible-light light source in said space based on said type of said human presence, and
   activate, via said at least one control interface, said infrared light source or said visible-light light source in dependence on said decision.

2. A system as claimed in claim 1, wherein said at least one processor is configured to receive, via said at least one input interface, one or more signals from one or more personal mobile devices, said one or more signals comprising one or more user identifications, and perform said person identification based on said one or more signals.

3. A system as claimed in claim 1, wherein said at least one processor is configured to:
   determine, via said at least one input interface, one or more characteristics of a set of received radio frequency signals, and
   perform said person identification based on said one or more characteristics of said set of received radio frequency signals.

4. A system as claimed in claim 1, wherein said at least one processor is configured to:
   determine an ambient light level via said at least one input interface,
   determine whether said ambient light level exceeds a light threshold, and
   activate said infrared light source or said visible-light light source in dependence on said decision upon determining that said ambient light level does not exceed said light threshold.

5. A system as claimed in claim 1, wherein said system is a lighting device which comprises said infrared light source and said visible-light light source.

6. A system as claimed in claim 1, wherein said at least one processor is configured to identify one or more infrared light sources within a certain distance of a device with a camera and select said infrared light source by selecting at least one infrared light source from said one or more infrared light sources.

7. A system as claimed in claim 1, wherein said at least one processor is configured to identify one or more infrared light sources in a field of view of a camera and select said infrared light source by selecting at least one infrared light source from said one or more infrared light sources.

8. A system as claimed in claim 6, wherein said at least one processor is configured to activate said camera or a camera function in dependence on said decision whether to activate said infrared light source.

9. A system as claimed in claim 1, wherein said at least one processor is configured to:
  decide whether to activate a group of infrared light sources in said space based on said type of said human presence, said group comprising a plurality of light sources; and
  activate and deactivate, via said at least one control interface, each of said group of infrared light sources in sequence in dependence on said decision whether to activate said group of infrared light sources.

10. A method of activating an infrared light source or a visible-light light source, said method comprising:
  receiving input indicating human presence in a space;
  performing person identification based on said input and/or based on further input,
  determining a type of said human presence based on said input by determining whether said person identification resulted in a known and/or trusted person being identified;
  deciding whether to activate an infrared light source or a visible-light light source in said space based on said type of said human presence; and
  activating said infrared light source or said visible-light light source in dependence on said decision.

11. A computer program or suite of computer programs comprising at least one software code portion or a computer program product storing at least one software code portion, the software code portion, when run on a computer system, being configured for performing the method of claim 10.

* * * * *